(12) United States Patent
Shan et al.

(10) Patent No.: US 10,768,448 B2
(45) Date of Patent: Sep. 8, 2020

(54) APPARATUSES AND METHODS FOR BLUE-CUT LENSES

(71) Applicant: ESSILOR INTERNATIONAL, Charenton-le-Pont (FR)

(72) Inventors: Haifeng Shan, Shrewsbury, MA (US); Hao Wen Chiu, Holden, MA (US); Aref Jallouli, Shrewsbury, MA (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 16/335,206

(22) PCT Filed: Sep. 20, 2017

(86) PCT No.: PCT/EP2017/073796
§ 371 (c)(1),
(2) Date: Mar. 20, 2019

(87) PCT Pub. No.: WO2018/054984
PCT Pub. Date: Mar. 29, 2018

(65) Prior Publication Data
US 2019/0346695 A1    Nov. 14, 2019

(30) Foreign Application Priority Data
Sep. 20, 2016    (EP) .................................... 16306207

(51) Int. Cl.
*G02C 7/10* (2006.01)
*B29D 11/00* (2006.01)
*C08K 5/00* (2006.01)

(52) U.S. Cl.
CPC ........ *G02C 7/104* (2013.01); *B29D 11/00634* (2013.01); *C08K 5/0041* (2013.01); *G02C 2202/10* (2013.01)

(58) Field of Classification Search
CPC ....................................................... G02C 7/104
(Continued)

(56) References Cited

U.S. PATENT DOCUMENTS

2004/0125337 A1    7/2004    Boulineau et al.
2011/0075096 A1    3/2011    Ishak et al.

FOREIGN PATENT DOCUMENTS

WO    WO 2015/097492         7/2015
WO    WO-2015097492 A1 *    7/2015
(Continued)

OTHER PUBLICATIONS

Anonymous, "Beer-Lambert Law—Wikipedia" Retrieved from the Internet URL: < https://en.wikipedia.org/wiki/Beer-Lambert_law#History > Retrieved on Mar. 7, 2017.
(Continued)

*Primary Examiner* — Brent T O'Hern
(74) *Attorney, Agent, or Firm* — Norton Rose Fulbright US LLP

(57) ABSTRACT

A blue-cut wafer can be coupled to a lens, such that the blue-cut wafer can be configured to reduce by absorption at least a portion of light having a first wavelength range from 400 nanometers to 500 nanometers, preferably from 400 nanometers to 460 nanometers. The blue-cut wafer can permit light having a second wavelength range, the second wavelength range being greater than the first wavelength range, and homogenize a color appearance and a blue-cut performance level of the blue-cut wafer based on the blue-cut wafer having a maximum thickness and a minimum thickness within twenty percent of a nominal thickness of the blue-cut wafer.

11 Claims, 8 Drawing Sheets

(58) Field of Classification Search
USPC .......................................................... 428/156
See application file for complete search history.

(56) References Cited

FOREIGN PATENT DOCUMENTS

| WO | WO 2017/077357 | 5/2017 |
| WO | WO 2017/077358 | 5/2017 |
| WO | WO 2017/077359 | 5/2017 |
| WO | WO 2017/137372 | 8/2017 |

OTHER PUBLICATIONS

International Search Report and Written Opinion issued in International Patent Application PCT/EP2017/073796, dated Dec. 21, 2017.

* cited by examiner

APPARATUSES AND METHODS FOR BLUE-CUT LENSES

CROSS-REFERENCE TO RELATED APPLICATIONS

This application is a national phase application under 35 U.S.C. § 371 of International Application No. PCT/EP2017/073796 filed 20 Sep. 2017, which claims priority to European Patent Application No. 16306207.8 filed 20 Sep. 2016. The entire contents of each of the above-referenced disclosures is specifically incorporated by reference herein without disclaimer.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Blue light at a wavelength range of 400-500 nm, more specifically 400-460 nm and especially 415-455 nm is harmful to human eyes and has been described as playing a role in certain ocular diseases such as age-related macular degeneration (AMD).

To implement a blue-cut in an ophthalmic lens, blue blocking filters can be incorporated into the bulk of the lens substrate. However, due to the varying center-to-edge thickness of the resulting lenses of plus or minus diopter powers and the intrinsic color of the filters, the lenses can include a center-to-edge color difference, and inconsistency of the blue-cut level.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to embodiments of the disclosed subject matter, a blue-cut wafer can include one or more of blue blocking filters blended with a thermoplastic resin injection molded into the blue-cut wafer and a thermoplastic blue-cut film thermoformed into a blue-cut wafer. The blue-cut wafer can be coupled to a lens, such that the blue-cut wafer can be configured to reduce by absorption at least a portion of light having a first wavelength range from 400 nanometers to 500 nanometers, preferably from 400 nanometers to 460 nanometers, permit light having a second wavelength range, the second wavelength range including wavelengths greater than 460 nanometers, and homogenize a color appearance and a blue-cut performance level of the blue-cut wafer based on the blue-cut wafer having a maximum thickness and a minimum thickness within twenty percent of a nominal thickness of the blue-cut wafer.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
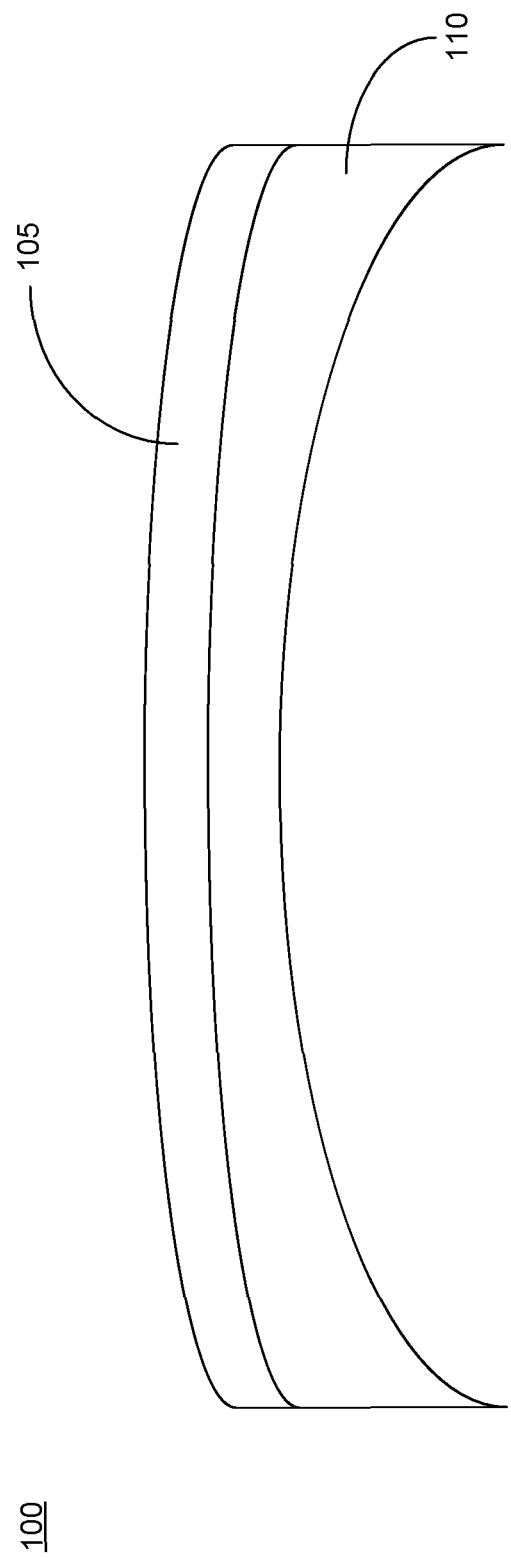
FIG. 1 depicts a side view of a blue-cut lens according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 depicts a side view of a blue-cut lens 100. The blue-cut lens 100 can include a blue-cut wafer 105 and a lens 110. A wafer can be a thin, round, and curved article that can be integrated onto a front surface of the lens 110 to introduce specific functions including blue-cut, photochromic, polarizing, and the like. More specifically, the blue-cut wafer 105 can include clear thermoplastics, the thermoplastics including dyes, pigments, or other absorbers that absorb blue light of a predetermined wavelength range. For example, the blue-cut wafer 105 can cut (e.g. absorb, reflect, etc.) blue light in the range of 400 nanometers to 500 nanometers, and preferably in the range of 400 nanometers to 460 nanometers. The blue-cut wafer 105 can have a maximum thickness and minimum thickness within twenty percent of a nominal thickness. Although the blue-cut wafer 105 can have non-uniform thickness to integrate with the lens 110, when the thickness variation of the blue-cut wafer 105 is less than a predetermined amount (e.g., 20%), the blue-cut wafer 105 can have a homogeneous color appearance and blue-cut performance level. The blue-cut performance level can be the success rate at which the blue-cut wafer 105 prevents at least a portion of the predetermined wavelength range of blue-light from passing through the blue-cut wafer 105.

The lens 110 can be an ophthalmic lens, such as a plus lens or a minus lens of various diopter powers, for example.

Figure 2:
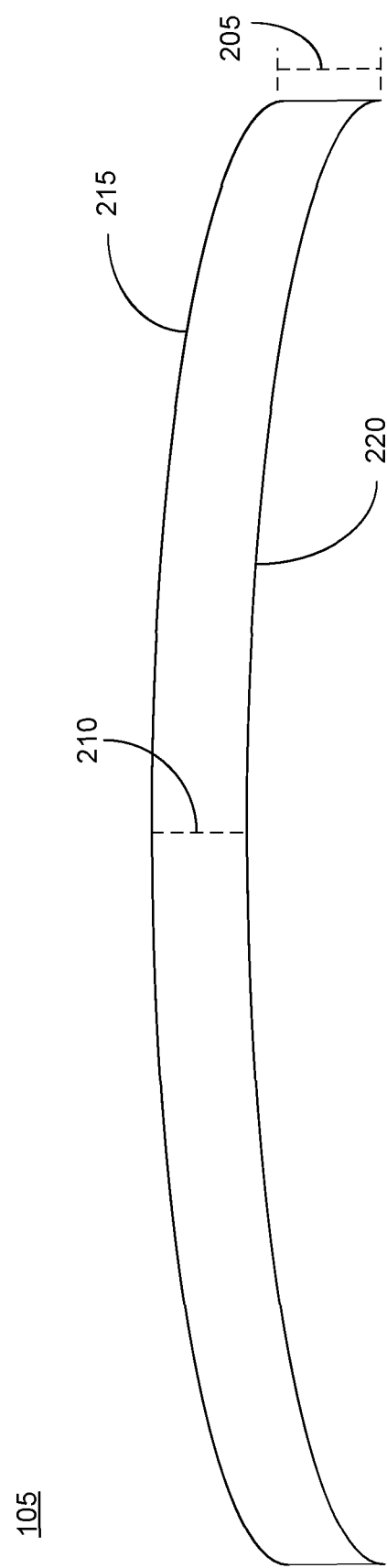
FIG. 2 depicts a side view of a blue-cut wafer according to one or more aspects of the disclosed subject matter.

FIG. 2 depicts a side view of the blue-cut wafer 105. The blue-cut wafer 105 includes an edge thickness 205, a center thickness 210, a front radius 215, and a back radius 220.

The center-to-edge thickness variation being within 20%, as determined by measurements of the edge thickness 205 and the center thickness 210, results in a homogeneous color appearance and blue-cut performance level. Because the blue-cut wafer 105 is responsible for cutting the blue-light rather than the lens 110, the lens 110 can be various diopter powers without issue because the effect of light path differences become negligible.

A selection of edge thickness 205 and center thickness 210 can be based on how much tolerance of a wafer thickness can be controlled during wafer manufacturing (e.g., injection molding, film extrusion, etc.). The tolerance can be based on a processing control, timing, and/or cost, for example.

The front radius 215 represents the top of the wafer. The back radius 220 represents the bottom on the wafer. For wafers by injection molding, the front radius 215 and back radius 220 are used to arrive at the thickness values for the wafer. For wafers of extruded or solvent casted films, the front radius 215 and back radius 220 are substantially equal. The thickness of a wafer including any variations is thus determined by the film fabrication process.

The blue-cut wafer 105 can be made of a clear thermoplastic substrate, such as polycarbonate (PC), polymethyl methacrylate (PMMA), cellulose triacetate (TAC), and the like. The blue-cut wafer 105 can be manufactured from a thermoplastic blue-cut film prepared via a film extrusion process or solvent casting. Alternatively, the blue-cut wafer 105 can be manufactured from a thermoplastic blue-cut resin injection molded into blue-cut wafers 105. In another aspect, the lens 110 can be made by machining (e.g. shaving portions of the lens to reduce the size of the lens) a thicker lens to reduce the size of the lens to a lens with a predetermined thickness. The thickness of the lens 110 can be based on the functionality required of the lens (e.g., improving eyesight) as would be known by one of ordinary skill in the art.

The blue-cut wafer 105 can be color balanced, and the color balancing can include calculating L, a*, and b* after mixing the color balancing dyes with blue blocking filters. The L, a*, and b* values can correspond to the Lab color space as would be known by one of ordinary skill in the art. The concentration of the dyes can be adjusted until a predetermined color balanced target is reached. For example, 3 ppm of ABS420 can be used as a predetermined concentration as further described herein.

Figure 3A:
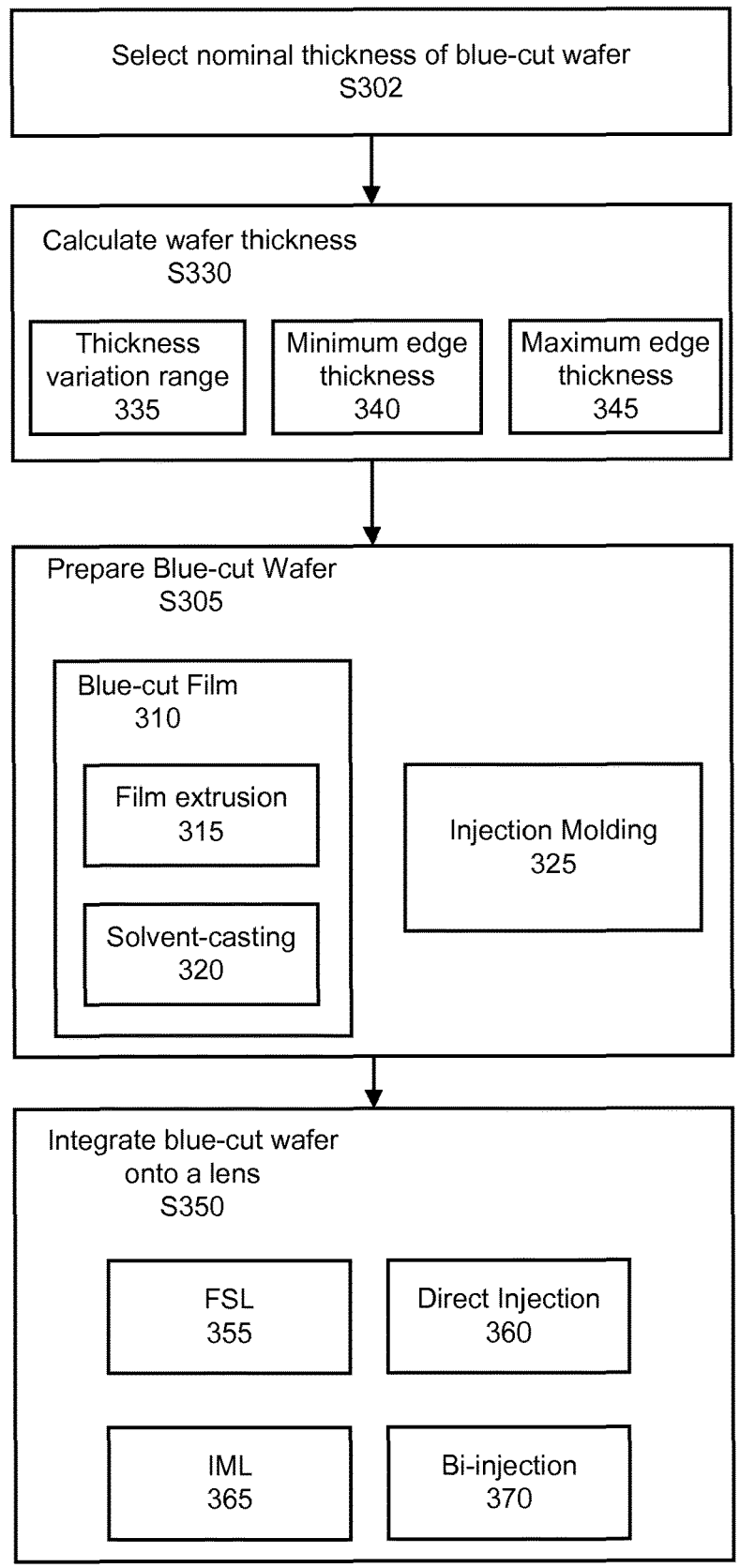
FIGS. 3A and 3B are each an exemplary work flow for producing the blue-cut lens 100 according to one or more aspects of the disclosed subject matter.

FIG. 3A is an exemplary work flow for producing the blue-cut lens 100 according to one or more aspects of the disclosed subject matter.

The blue-cut lens 100 is able to absorb at least a portion of a predetermined wavelength range corresponding to blue light, such that the absorbed blue light is prevented from passing through the blue-cut lens 100.

To produce the blue-cut lens 100, a nominal thickness of the blue-cut wafer can be selected in S302. The nominal thickness can be used as the thickness measurement to which the thickness variation can be compared.

Figure 7:
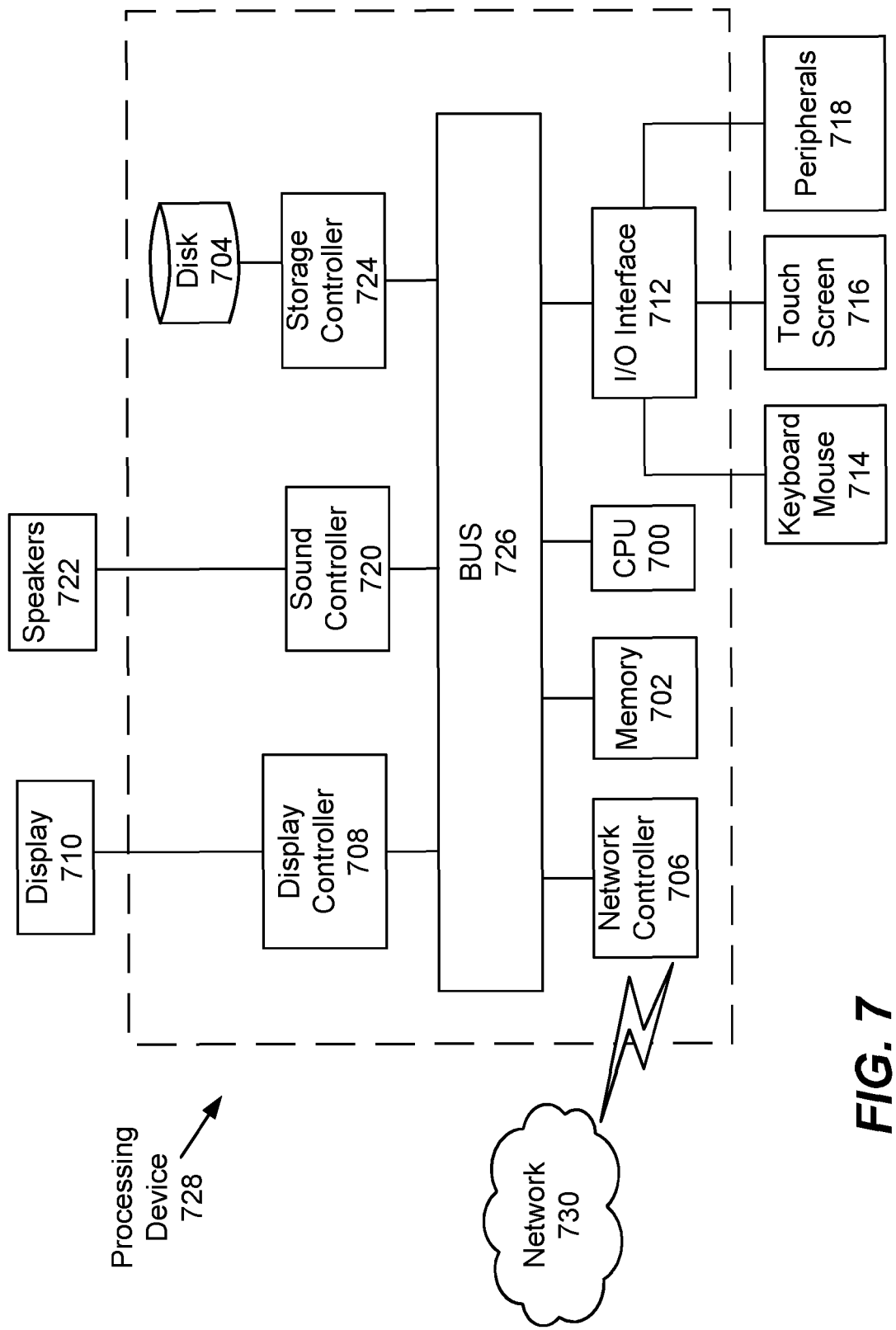
FIG. 7 is a hardware block diagram of a processing device according to one or more aspects of the disclosed subject matter.

In S330, various measurements corresponding to the thickness of the blue-cut wafer 105 can be calculated using processing circuitry, for example (see FIG. 7). The thickness calculations can include a thickness variation range 335, a minimum edge thickness 340, and a maximum edge thickness 345. The thickness variation range can be within 20% of a nominal thickness of the blue-cut wafer 105 to homogenize color appearance and the blue-cut performance level of the blue-cut wafer 105. Additionally, the thickness variation range 335 can include measurements of the center thickness 210 to assist in determining/calculating the thickness variation range 335.

In S305, the blue cut wafer 105 can be prepared. The blue-cut wafer 105 can be manufactured from a blue-cut film 310 or via injection molding 325. The blue-cut film 310 can be manufactured via film extrusion 315 or via solvent casting 320 as further described herein. The blue-cut wafer 105 can be prepared having a center thickness 205 at the nominal thickness and the edge thickness being within the maximum edge thickness 345 and the minimum edge thickness 340, wherein the maximum edge thickness 345 and minimum edge thickness 340 are based on being within the twenty percent thickness variation.

In S350, the blue-cut wafer 105 can be integrated onto the lens 110. Various techniques for integrating the blue-cut wafer 105 onto the lens 110 can include front side lamination (FSL) 355, direct injection 360, in-mold lamination IML 365, and bi-injection 370. Additionally, IML 365 can include a first technique of coating the blue-cut wafer 105 with adhesive and inserting the blue-cut wafer 105 into the mold. In another aspect, the IML 365 can include using liquid glue for bonding the blue-cut wafer 105 to the lens 110. Once the blue-cut wafer 105 is secured to the lens 110, the blue-cut lens 100 can include blue-cut functionality with a homogenous color appearance and blue-cut performance level.

For example, the values listed below in Table 1, Table 2, and Table 3, Table 4 can correspond to the results of an exemplary blue-cut lens, such as the blue-cut lens 100, that includes a blue-cut wafer 105 having a nominal thickness of 1.1 millimeters produced via injection molding (e.g., injection molding 325) of a mixture of three parts per million of ABS420 in Sabic Lexan polycarbonate (PC). The resulting wafer can have thickness values ranging from 1.0 millimeters to 1.3 millimeters across the whole wafer, and show a uniform color appearance and blue-cut performance level. However, the values could range from 0.88 millimeters to 1.32 millimeters to maintain a thickness variation within 20% of the nominal thickness. Additionally, the thickness variation can be within 50% of the nominal thickness while still maintaining ΔE=1, where ΔE is a measure of color difference.

TABLE 1

| Concept | Measurement point | % T | L* | a* | b* |
|---|---|---|---|---|---|
| Filters in Wafer | Measured @ center | 93.8 | 97.6 | −1.1 | 1.8 |
| | Measured @ edge | 93.9 | 97.6 | −1.5 | 2.9 |

TABLE 2

| | Δ % T | ΔE |
|---|---|---|
| Filters in Wafer | 0.1 | 1.0 |

TABLE 3

| | Center thickness | | | | Max. edge thickness | | | | Min edge thickness | | | |
|---|---|---|---|---|---|---|---|---|---|---|---|---|
| ΔE | Thickness | L | a* | b* | Thickness | L | a* | b* | Thickness | L | a* | b* |
| 1.0 | 1.10 mm | 94.5 | −1.1 | 1.8 | 1.65 mm | 93.9 | −1.5 | 2.3 | 0.56 mm | 95.2 | −0.6 | 1.3 |

TABLE 4

| | ΔL | Δa* | Δb* | ΔE |
|---|---|---|---|---|
| Difference between center and max edge thickness | 0.6 | 0.4 | −0.5 | 1.0 |
| Difference between center and min. edge thickness | −0.7 | −0.5 | 0.5 | 1.0 |

Table 3 and Table 4 describe the results based on the formulation of ABS420 with color balancing in a PC wafer, which can be based on determining/calculating the maximum edge thickness and the minimum edge thickness as further described herein.

Figure 3B:
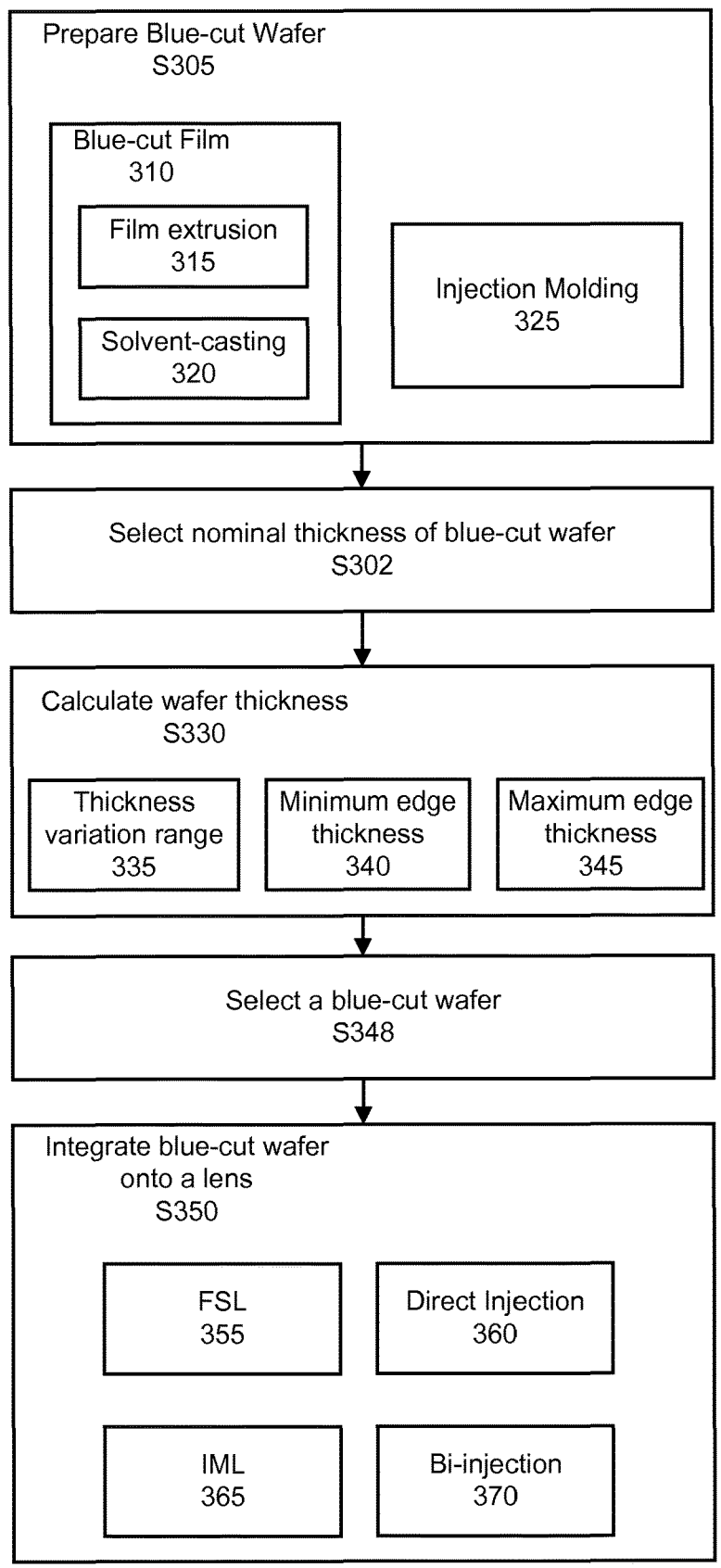

FIG. 3B can include the same steps as FIG. 3A. However, preparing the blue-cut wafer in S305 can be the first step in the work flow. Additionally, S348 can follow S330 and occur before S350. In S348, the blue-cut wafer 105 can be selected based on the various wafer thickness calculations in S330.

Steps S302, S305, S330, and S350 of FIG. 3B are represented in the description for FIG. 3A (except where explicitly indicated as different).

Figure 4:
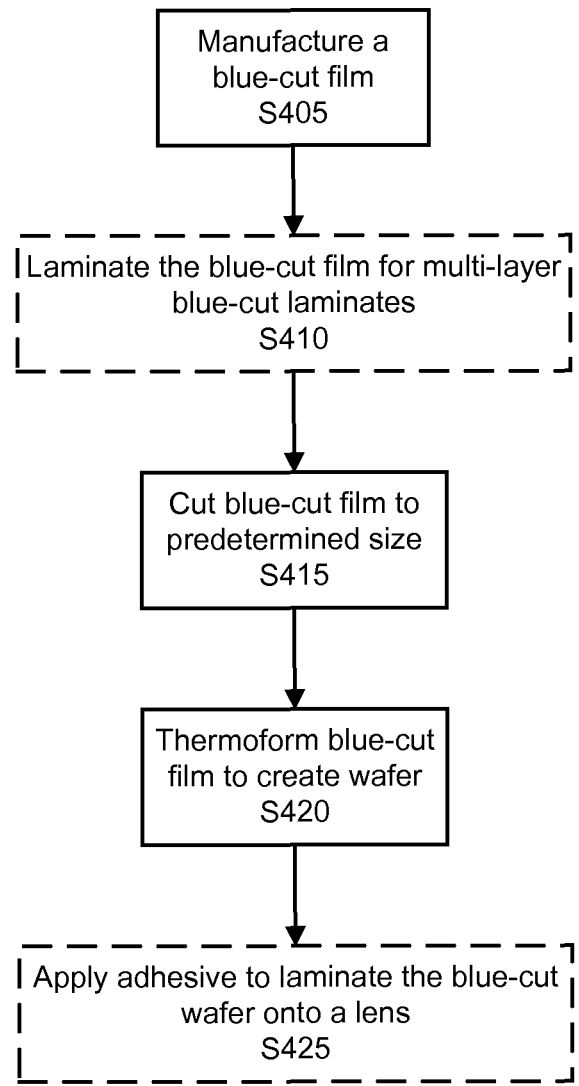
FIG. 4 is a work flow for manufacturing a blue-cut wafer from a film according to one or more aspects of the disclosed subject matter.

FIG. 4 is a work flow for manufacturing a blue-cut wafer from a film.

In S405, a blue-cut film can be manufactured. The blue-cut film can be manufactured via a film extrusion system or via solvent-casting. For film extrusion, blue blocking filters and a thermoplastic resin in the form of pellets or powder are extruded together through a die onto a chill-roller to produce a blue-cut film. The ratio of resin to blue blocking filters can be based on the types of blue blocking filters and the desired blue cut performance. The combination of the thermoplastic resin and blue-blocking filters can be converted into a film by the film extrusion system as would be known by one of ordinary skill in the art. For solvent-casting, blue blocking filters and a thermoplastic resin are first dissolved in a solvent to form film dope. The film dope can then be casted onto a carrier film. After a drying step for the solvent to evaporate, the thermoplastic blue-cut film is formed. The solvent-casting process can be suitable for blue blocking filters that are thermally sensitive because less heating is involved in the solvent-casting process. Similarly to film extrusion, the ratio of resin to blue blocking filters can be based on the types of blue blocking filters and the desired blue cut performance.

The blue-cut film can include various thermoplastics including one or more of polyacrylics, polyols, polyamines, polyamides, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polycarbonates, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, and cellulose triacetate.

In S410, multi-layer blue-cut laminates can be made by laminating the blue-cut film. The optional lamination step can be used to construct a multi-layer laminate from the blue-cut film. The one or more additional layers can be used to protect the blue-cut film from exposure to extensive heat or solvent, to provide compatibility to other thermoplastics for fuse-bonding, add additional functions including polarizing, NIR-cut, etc., and the like.

In S415, the blue-cut film can be cut to a predetermined size. The predetermined size can be based on various sizes of lenses 110 to which the blue-cut film will be attached, for example.

In S420, the blue-cut film can be thermoformed to create the blue-cut wafer 105. The thermoforming process can be used to create a curved wafer, such that the curve can match the curve of the various lenses 110 to which the blue-cut wafer 105 will be attached.

In S425, an adhesive can optionally be applied to laminate the blue-cut wafer 105 onto a lens 110.

Figure 5:
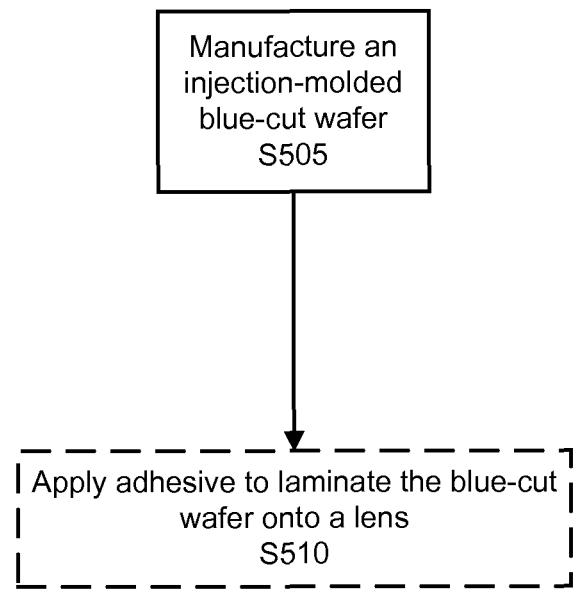
FIG. 5 is a work flow for manufacturing a blue-cut wafer via injection molding according to one or more aspects of the disclosed subject matter.

FIG. 5 is a work flow for manufacturing a blue-cut wafer 105 via injection-molding.

In S505, an injection molded blue-cut wafer 105 can be manufactured. Blue blocking filters can be blended with a thermoplastic resin and then injection-molded to create the blue-cut wafer 105. Further specifics of injection-molded thin wafers can be found in U.S. Pat. No. 7,854,865, which is herein incorporated by reference.

In S510, an adhesive can optionally be applied to laminate the blue-cut wafer 105 onto the lens 110.

Figure 6:
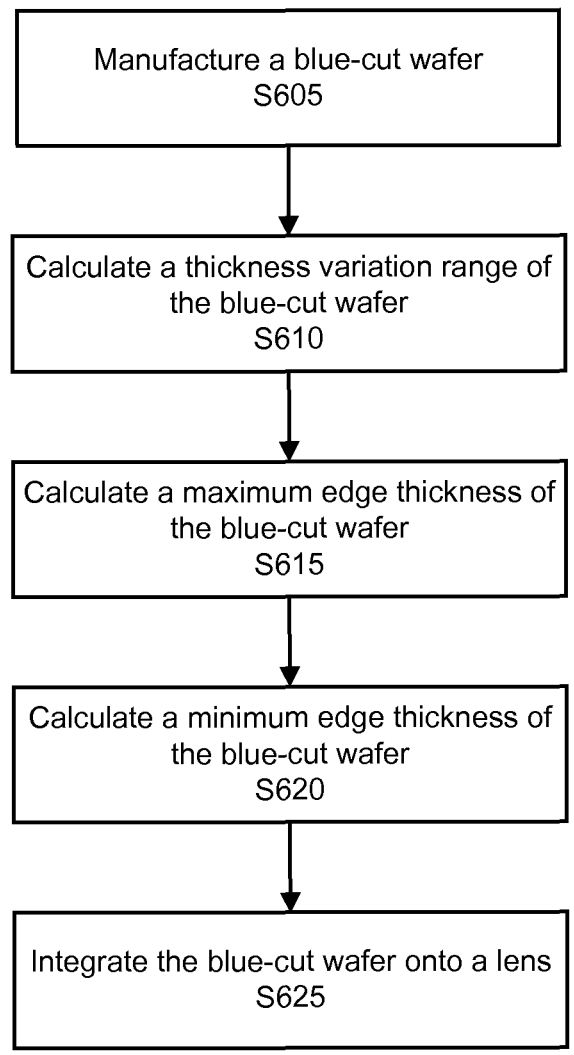
FIG. 6 is a work flow for manufacturing a blue-cut lens according to one or more aspects of the disclosed subject matter.

FIG. 6 is a work flow for manufacturing a blue-cut lens 100.

In S605, the blue-cut wafer 105 can be manufactured as described in one of FIG. 4 or FIG. 5.

In S610, a thickness variation range of the blue-cut wafer 105 can be calculated. ΔE≤1, where ΔE is the color difference calculated using the CIE76 formula as would be known by one of ordinary skill in the art, can be used as criteria to determine the wafer thickness variation range based on $\Delta E=1$ being the smallest color difference a human eye can detect. In other words, the thickness variation range should result in a homogenous color appearance of the blue-cut wafer 105 because any difference in color is too small to be detected by the human eye. If the thickness variation range were greater than a predetermined variation, the color of the blue-cut wafer 105 would be heterogeneous (i.e., at least one noticeable color difference).

In S615, a maximum edge thickness of the blue-cut wafer 105 can be calculated. The maximum edge thickness can have a $\Delta E$ of 1 compared to the wafer center thickness 210. To determine the maximum edge thickness, the light absorption from transmission at each wavelength can be calculated. The wafer thickness can then be increased by 0.01 millimeters and the light absorptions can be calculated. A color spectrum at the current thickness of the wafer can be determined. The color spectrum can then be converted to Lab color space. $\Delta E$ can then be calculated between the original thickness and the current thickness. If $\Delta E \leq 1$, then the wafer thickness can be increased by 0.01 millimeters until $\Delta E=1$. When $\Delta E=1$, the maximum edge thickness of the wafer can be determined.

In S620, the minimum edge thickness can be calculated. The minimum edge thickness can have a $\Delta E$ of 1 compared to the wafer center thickness 210. The minimum edge thickness can be calculated similarly to the maximum edge thickness as described in S615. However, rather than increasing the thickness by 0.01 millimeters until $\Delta E=1$, the thickness can be decreased by 0.01 millimeters until $\Delta E=1$ to determine the minimum edge thickness.

In S625, the blue-cut wafer 105 can be integrated onto the lens 110. The blue-cut wafer 105 can be integrated onto the lens 110 through various techniques including front-side lamination, direct injection, in-mold lamination, and bi-injection. The integration of the blue-cut wafer 105 onto the lens 110 can create the blue-cut lens 100. The blue-cut lens 100 can absorb the predetermined wavelength range of blue light rather than reflecting it. In other words, the blue-cut lens 100 can absorb the predetermined wavelength range of blue light, while also permitting the wavelength ranges outside of the predetermined wavelength range of blue light.

Front-side lamination can include a blue-cut wafer 105 pre-coated with adhesive and laminated onto the lens 110 under pressure and heat to conform to the front surface of the lens 110.

Direct injection can include a blue-cut wafer 105 inserted into a mold cavity followed by injection of a molten thermoplastic that is fuse-bonded to the blue-cut wafer 105. In this process, the blue-cut wafer 105 can be subjected to high melt temperatures and high shear during injection molding.

In-mold lamination can include opening a mold and inserting a blue-cut wafer 105 coated with adhesive. The mold can then be closed to laminate the blue-cut wafer 105 onto the front surface of the lens 110 utilizing the clamping pressure and heat from the mold. The blue-cut wafer 105 experiences a low mold temperature which can be beneficially for heat sensitive blue blocking filters. Additionally, there is no shear involved. Further specifics relating to in-mold lamination can be found in U.S. Pat. No. 7,820,081 which is herein incorporated by reference in its entirety.

Alternatively, the injection-molded lenses can include liquid glue to bond the blue-cut wafer 105 to the lens 110.

It should be appreciated that the steps of FIG. 3A, FIG. 3B, FIG. 4, FIG. 5, and FIG. 6 can be performed in another order, and/or the steps can be performed simultaneously.

Bi-injection can include making the blue-cut wafer 105 in-situ by using two injection units. A first injection unit to inject the top blue-cut wafer 105 layer using a mixture of blue blocking filters and a thermoplastic, and a second injection unit to injection the thermoplastic lens substrate.

Typical prescription blue-cut lenses typically have a center-to-edge thickness variation of greater than 20%, especially for high minus or plus lenses. Therefore, an advantage of manufacturing the blue-cut lens 100 is that the resulting lenses can have a homogeneous color appearance and blue-cut level regardless of the diopter power of the lens. The homogenous color appearance and blue-cut level can be achieved by the center-to-edge thickness variation of the blue-cut wafer 105 being within 20%. The homogenous color appearance improves the aesthetic appearance of the blue-cut lens 100.

Additionally, the existing monomer formulation or thermoplastic resin does not need to be altered to manufacture the blue-cut lenses 100.

Further, additional functions (e.g., polarizing, NIR cut, other specific light filters, color balancing, etc.) can easily be added to the resulting blue-cut lenses 100 through the use of multi-layered wafers.

The heat sensitive blue blocking dyes that typically would not survive a thermoset casting process or thermoplastic injection-molding process can also be used because the processes for preparing the blue-cut wafer 105 and integrating the blue-cut wafer 105 onto the lens 110 are typically at a much lower temperature, especially when the blue-cut layer is protected in the case of a multi-layer wafer.

Next, a hardware description of a processing device 728, according to exemplary embodiments is described with reference to FIG. 7. The processing device 728 can include a computer, a server, smart phone, laptop, PDA, any processor or processing circuitry, and the like. In FIG. 7, the processing device 728 includes a CPU 700 which performs the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing device 728 communicates, such as a server or computer.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

The hardware elements in order to achieve the processing device 728 may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The processing device 728 in FIG. 7 also includes a network controller 706, such as an Intel Ethernet PRO network interface card from Intel Corporation of America, for interfacing with network 730. As can be appreciated, the network 730 can be a public network, such as the Internet, or a private network such as an LAN or WAN network, or any combination thereof and can also include PSTN or ISDN sub-networks. The network 730 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing device 728 further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the processing device 728, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the processing device 728. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

(1) A blue-cut wafer including one or more of blue blocking filters blended with a thermoplastic resin injection molded into the blue-cut wafer and a thermoplastic blue-cut film thermoformed into the blue-cut wafer, wherein the blue-cut wafer is configured to reduce by absorption at least a portion of light having a first wavelength range from 400 nanometers to 500 nanometers, and homogenize a color appearance and a blue-cut performance level of the blue-cut wafer.

(2) The blue-cut wafer according to (1), wherein the homogenized color appearance and blue-cut performance level of the blue-cut wafer is based on the blue-cut wafer having a maximum thickness and a minimum thickness within twenty percent of a nominal thickness of the blue-cut wafer.

(3) The blue-cut wafer according to (1)-(2), wherein the blue-cut wafer includes a selection of a difference between an edge thickness and a center thickness of the blue-cut wafer based on the selected range of thickness of the blue-cut wafer.

(4) The blue-cut wafer according to (1)-(3), wherein the blue-cut wafer is configured to permit light having a second wavelength range, the second wavelength range including wavelengths outside the first wavelength range.

(5) The blue-cut wafer according to (1)-(4), wherein the blue-cut wafer includes one or more additional layers providing one or more of polarization, near-infrared cut, additional light filters, and color balancing.

(6) A method of manufacturing a transparent optical article including blending blue blocking filters with a thermoplastic resin injection molded into a blue-cut wafer, or thermoforming a blue-cut film into the blue-cut wafer, the blue-cut wafer configured to reduce by absorption at least a predetermined portion of light having a first wavelength range from 400 nanometers to 500 nanometers, and homogenize a color appearance and a blue-cut performance level of the blue-cut wafer; calculating a thickness variation range of the blue-cut wafer; calculating a maximum edge thickness and minimum edge thickness of the blue-cut wafer; and integrating the blue-cut wafer onto a lens via one or more of front-side lamination, direct injection, in-molding lamination, or bi-injection.

(7) The method according to (6), further including selecting a difference between an edge thickness and a center thickness of the blue-cut wafer based on the thickness variation range of the blue-cut wafer.

(8) The method according to (6)-(7), further including selecting a blue-cut wafer thickness less than 1.5 millimeters, preferably less than 1.3 millimeters, and more preferably less than 1.1 millimeters.

(9) The method according to (6)-(8), wherein the homogenized color appearance and blue-cut performance level of the blue-cut wafer is based on the blue-cut wafer having a maximum thickness and a minimum thickness within twenty percent of a nominal thickness of the blue-cut wafer.

(10) The method according to (6)-(9), further including permitting, via the blue-cut wafer, light having a second wavelength range outside the first wavelength range.

(11) A blue-cut wafer including a blue-cut film being one of extrusion based film, wherein the extrusion based film includes blue blocking filters and a thermoplastic resin in the form of pellets or powder extruded together through a die onto a chill-roller, wherein the blue blocking filters are configured to absorb at least a portion of blue light from a wavelength range from 400 nanometers to 500 nanometers, or solvent-casting based film, wherein solvent-casting based film includes the blue blocking filters and a thermoplastic resin dissolved into a solvent to form a film dope casted onto a carrier film; or an injection molded wafer including the blue blocking filters blended with a thermoplastic resin.

(12) The blue-cut wafer according to (11), wherein the blue-cut film includes one or more of polyacrylics, polyols, polyamines, polyamides, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polycarbonates, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, and cellulose triacetate.

(13) The blue-cut wafer according to (11)-(12), wherein the blue-cut film is the extrusion based film, and wherein the extrusion based film includes the blue blocking filters and the thermoplastic resin in the form of pellets or powder extruded together through the die onto the chill-roller.

(14) The blue-cut wafer according to (11)-(13), wherein the blue-cut film is the solvent-casting based film, and wherein solvent-casting based film includes the blue blocking filters and the thermoplastic resin dissolved into the solvent to form the film dope casted onto the carrier film.

(15) The blue-cut wafer according to (11)-(14), wherein the blue-cut wafer is the injection molded wafer including the blue blocking filters blended with the thermoplastic resin.

(16) The blue-cut wafer according to (1), wherein the first wavelength range is from 400 nanometers to 460 nanometers.

(17) The blue-cut wafer according to (11), wherein the first wavelength range is from 400 nanometers to 460 nanometers.

(18) A transparent optical article including a lens, and the blue cut wafer according to (1), wherein the blue cut wafer is attached to a front face of the lens.

The invention claimed is:

1. A blue-cut wafer, comprising:
one or more of blue blocking dyes blended with a thermoplastic resin injection molded into the blue-cut wafer; or
a thermoplastic blue-cut film thermoformed into the blue-cut wafer;
wherein:
the blue-cut wafer is configured to reduce by absorption at least a portion of light having a first wavelength range from 400 nanometers to 500 nanometers;
the blue-cut wafer has a maximum thickness and a minimum thickness within twenty percent of a nominal thickness of the blue-cut wafer; and
a color appearance and a blue-cut performance level of the blue-cut wafer are homogenized in such a manner as $\Delta E \leq 1$, where $\Delta E$ is a color difference between a wafer center and a wafer edge calculated using color-difference formula CIE76.

2. The blue-cut wafer of claim 1, wherein the blue-cut wafer includes a selection of a difference between an edge thickness and a center thickness of the blue-cut wafer based on a selected range of thickness of the blue-cut wafer.

3. The blue-cut wafer of claim 2, wherein the blue-cut wafer is configured to permit light having a second wavelength range, the second wavelength range including wavelengths outside the first wavelength range.

4. The blue-cut wafer of claim 1, wherein the blue-cut wafer includes one or more additional layers providing one or more of polarization, near-infrared cut, additional light filters, and color balancing.

5. A method of manufacturing a transparent optical article comprising the blue-cut wafer of claim 1, comprising:
blending blue blocking dyes with a thermoplastic resin injection molded into a blue-cut wafer or thermoforming a blue-cut film into the blue-cut wafer,
calculating a thickness variation range of the blue-cut wafer;
calculating a maximum edge thickness and minimum edge thickness of the blue-cut wafer; and
integrating the blue-cut wafer onto a lens via one or more of front-side lamination, direct injection, in-molding lamination, or bi-injection.

6. The method of claim 5, further comprising:
selecting a difference between an edge thickness and a center thickness of the blue-cut wafer based on the thickness variation range of the blue-cut wafer.

7. The method of claim 6, further comprising:
selecting a blue-cut wafer thickness less than 1.5 millimeters.

8. The method of claim 6, further comprising:
selecting a blue-cut wafer thickness less than 1.3 millimeters.

9. The method of claim 6, further comprising:
selecting a blue-cut wafer thickness less than 1.1 millimeters.

10. The method of claim 5, wherein the homogenized color appearance and blue-cut performance level of the blue-cut wafer is based on the blue-cut wafer having a maximum thickness and a minimum thickness within twenty percent of a nominal thickness of the blue-cut wafer.

11. The method of claim 5, further comprising:
permitting, via the blue-cut wafer, light having a second wavelength range outside the first wavelength range.

* * * * *